United States Patent
Broadworth et al.

(10) Patent No.: US 11,140,270 B2
(45) Date of Patent: *Oct. 5, 2021

(54) CONCURRENT COLLABORATION CONFERENCE PORT MANAGEMENT

(71) Applicant: Level 3 Communications, LLC, Broomfield, CO (US)

(72) Inventors: Andrew J. Broadworth, Thornton, CO (US); Robert F. Nance, Westminster, CO (US); Gregory T. Ellison, Erie, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 23 days.

This patent is subject to a terminal disclaimer.

(21) Appl. No.: 16/878,188

(22) Filed: May 19, 2020

(65) Prior Publication Data
US 2020/0280638 A1    Sep. 3, 2020

Related U.S. Application Data

(63) Continuation of application No. 15/339,203, filed on Oct. 31, 2016, now Pat. No. 10,666,810.
(Continued)

(51) Int. Cl.
*H04M 7/00* (2006.01)
*H04M 3/36* (2006.01)
(Continued)

(52) U.S. Cl.
CPC .......... *H04M 7/006* (2013.01); *H04L 65/403* (2013.01); *H04L 67/14* (2013.01); *H04L 67/22* (2013.01);
(Continued)

(58) Field of Classification Search
CPC .................. H04M 3/56; H04W 4/08
See application file for complete search history.

(56) References Cited

U.S. PATENT DOCUMENTS

2006/0067499 A1   3/2006 Oliveira
2007/0116225 A1*  5/2007 Zhao ...................... H04M 3/56
                                       379/202.01
(Continued)

OTHER PUBLICATIONS

International Preliminary Report on Patentability, dated Dec. 18, 2018, Int'l App. No. PCT/US16/059710, Int'l Filing Date Oct. 31, 2016; 6 pgs.
(Continued)

*Primary Examiner* — Sulaiman Nooristany

(57) ABSTRACT

Aspects of the present disclosure involve systems and methods for a collaboration conferencing system to track a total number of concurrently utilized ports across any number of conferencing bridges of the network for a particular customer and one or more billing actions may occur based on this tracking. This may result in an alternate billing option for the customer's use of the system. Further, a telecommunications network administrator may provide access to the collaboration conferencing system based on a total number of concurrently utilized ports rather than on a per conference or per minute basis. With the information of the number of purchased ports by the customer, the administrator may more accurately predict an available capacity for the collaboration conferencing system needed to support all of the users of the system and the potential collaboration conferences.

18 Claims, 4 Drawing Sheets

Related U.S. Application Data

(60) Provisional application No. 62/350,913, filed on Jun. 16, 2016.

(51) Int. Cl.
    *H04M 3/56*         (2006.01)
    *H04L 29/08*       (2006.01)
    *H04L 29/06*       (2006.01)
    *H04W 4/08*       (2009.01)

(52) U.S. Cl.
    CPC .......... *H04M 3/367* (2013.01); *H04M 3/562* (2013.01); *H04W 4/08* (2013.01)

(56) References Cited

U.S. PATENT DOCUMENTS

| | | |
|---|---|---|
| 2010/0136980 A1 | 6/2010 | Linguist et al. |
| 2010/0165889 A1 | 7/2010 | Madabhushi et al. |
| 2013/0027509 A1 | 1/2013 | Ranganath |
| 2013/0063537 A1 | 3/2013 | Emori |
| 2013/0088564 A1 | 4/2013 | Hillier |
| 2017/0366675 A1* | 12/2017 | Broadworth .......... H04L 65/403 |

OTHER PUBLICATIONS

International Search Report dated Jan. 23, 2017, Int'l Appl. No. PCT/US16/059710, Int'l Filing Date Oct. 31, 2016; 3 pgs.
Written Opinion of the International Searching Authority dated Jan. 23, 2017, Int'l Appl. No. PCT/US16/059710, Int'l Filing Date Oct. 31, 2016; 4 pgs.

* cited by examiner

CONCURRENT COLLABORATION CONFERENCE PORT MANAGEMENT

TECHNICAL FIELD

Aspects of the present disclosure generally relate to systems and methods that provide for collaboration conferencing with multiple participants using devices connected to a telecommunication network, including a VoIP network, and more specifically for managing concurrent ports being utilized by a particular client or group with access to the collaboration conferencing system.

BACKGROUND

Telecommunication networks provide for the transmission of information across some distance through terrestrial, wireless or satellite communication networks. Such communications may involve voice, data or multimedia information, among others. In addition, telecommunication networks often offer features and/or services to the customers of the network that provide flexible and varied ways in which the communications are transmitted over the network. For example, some telecommunication networks provide a conferencing feature that allows several users of the network to communicate at once, rather than a simple person-to-person communication. The number of participants to a conference communication may range from a few users to several hundred users communicating on the same telephonic and/or data call. Generally, the number of possible participants to a particular conference is determined by the telecommunication devices utilized by the collaboration conferencing system and/or the user account associated with a client of the system.

Typically, conferencing communications require participants to the conference to place a telephonic call to a dedicated conferencing number. Some networks also require the participants to enter a conference call code into the keypad of a telephonic device. The conferencing number and code are then utilized by the telecommunications network to connect that participant to a conferencing bridge device. In still other embodiments, the conferencing bridge may request a second identification code that indicates the participant is a chairperson for the conference. In general, a conferencing bridge is a telecommunications device that hosts the participants of a conferencing communication such that the participants can attend the communication. Thus, the network typically receives the dialed number and conference code from each participant and connects the participant to the conferencing bridge. Once connected to the conference bridge, the participant may take part in the conferencing communication. A chairperson to the collaboration conference may have certain additional features for the conference, such as the ability to mute participants, hang-up on participants, or to control aspects of an associated web conference.

It is with these and other issues in mind that various aspects of the present disclosure were developed.

SUMMARY

One implementation of the present disclosure may take the form of a telecommunication network comprising a plurality of conference bridges and at least one routing device. The at least one routing device is configured to receive collaboration conferencing information from the plurality of conference bridges, the collaboration conferencing information associated with collaboration conferences hosted by each of the plurality of conference bridges, correlate the collaboration conferencing information from the plurality of conference bridges with a customer identification of a customer group to the telecommunications network, and calculate a total number of utilized ports of the plurality of conference bridges for the customer group associated with the telecommunications network. The at least one routing device is further configured to perform the operations of receive a request at the at least one routing device to initiate a new collaboration conference from a user associated with the customer group and process the received request to initiate the new collaboration conference based at least on the calculated total number of utilized ports of the plurality of conference bridges for the customer group.

Another implementation of the present disclosure may take the form of a collaboration conferencing management device comprising at least one communication port for communication with a network, a processing device, and a computer-readable medium connected to the processing device configured to store instructions. When the instructions are executed, the processing device performs the operations of receiving, at a collaboration conferencing system managing device, collaboration conferencing information from the plurality of conference bridges, the collaboration conferencing information associated with collaboration conferences hosted by each of the plurality of conference bridges, correlating the collaboration conferencing information from the plurality of conference bridges with a customer identification of a customer group to the telecommunications network, and calculating a total number of utilized ports of the plurality of conference bridges for the customer group associated with the telecommunications network. The processing device may further receive a request from a user communication device at the collaboration conferencing system managing device, the request generated to initiate a new collaboration conference from a user associated with the customer group and process the received request to initiate the new collaboration conference based at least on the calculated total number of utilized ports of the plurality of conference bridges for the customer group. Yet another embodiment of the present disclosure includes a method of the same or similar operations.

DETAILED DESCRIPTION

Figure 1:
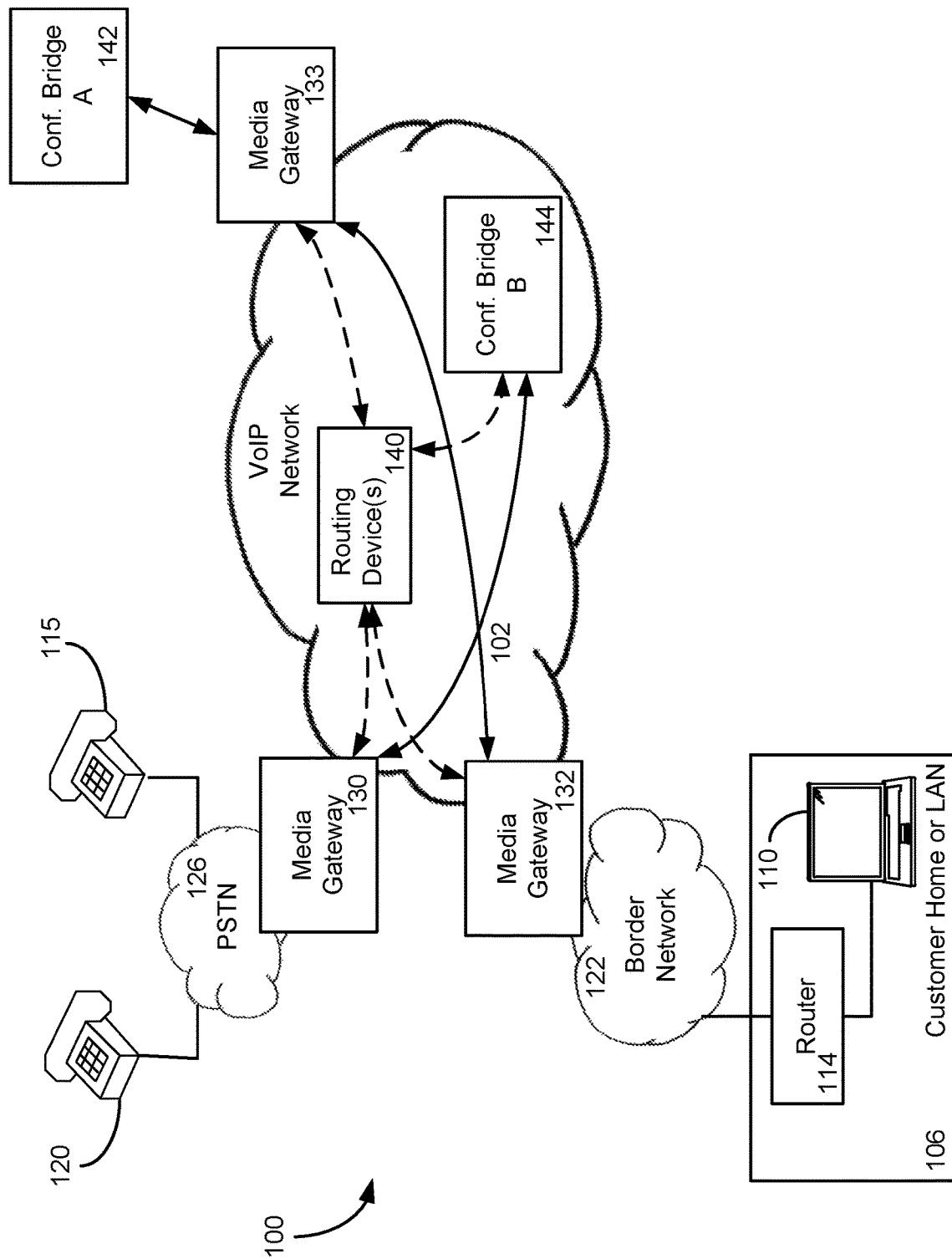
FIG. 1 schematic diagram illustrating an exemplary Voice over Internet Protocol (VoIP) operating environment, including a central conferencing routing server, in accordance with one embodiment.

Aspects of the present disclosure involve systems, methods, computer program products, and the like, for collaboration conferencing with multiple participants over a communications network, and more specifically for managing concurrent ports being utilized by a particular client or group with access to a collaboration conferencing system. The term "collaboration conferencing" as used herein includes any type of multimedia conferencing over a network, such as audio conferencing, web or internet conferencing and multi-site video conferencing. In one embodiment, the conferencing system may utilize Session Initiation Protocol (SIP) to route collaboration conferences within the telecommunications network. The SIP-based routing provides for the exchanging of information from one device of the conferencing system to another that is not available in non-IP based conferencing systems.

In addition, aspects of the present disclosure involve systems, methods, computer program products, and the like, for executing one or more actions based on a total number of concurrent ports utilized by a client of the collaboration conferencing system. In general, collaboration conferencing systems typically provide access to a conferencing bridge through an access code provided to users of the system. Thus, when a client or user requests or purchases collaboration conferencing services from a telecommunications network, a network administrator provisions access to the system and provides the user with an access code that the user may use to access the collaboration conference system. In many instances, the network limits the number of concurrent ports for any single collaboration conferencing session. For example, the conferencing bridge may limit the number of utilized ports (or users) that have access to a conference to 300 such that only 300 lines of communication are made available for that conference at the bridge. In general, however, the limit of utilized ports for a collaboration conference may be any number as determined by the network or bridge device or a network administrator.

In many cases, billing a customer for use of the collaboration conferencing system of the telecommunications network occurs on a per conference or per minute basis. For example, a centralized routing device within the telecommunications network may track the number of minutes utilized by a customer for all of the conferences that occur over a period of time (such as monthly). The cost to the customer for utilizing the collaboration feature of the network is then based on the tracked minutes of conferencing. In another billing example, the customer may be billed per collaboration conference session regardless of the number of participants to the conference. Thus, a collaboration conference with three participants may be billed the same amount as a collaboration conference with 300 participants. However, this configuration may cause inefficiencies in the operation of the telecommunications network as the network may not be able to predict the number of users to the collaboration conferencing system for the customer at any one time. Further, in some instances, the customer may desire to pay for the collaboration conferencing system on a per-user rate rather than a per minute basis.

This disclosure provides a system and method for providing a port usage prediction and alternate billing option in a collaboration conferencing system of a telecommunications network. In one embodiment of the present disclosure, the collaboration conferencing system may be configured to track a total number of concurrently utilized ports across any number of conferencing bridges of the network for a particular customer and one or more billing actions may occur based on this tracking. For example, a customer may have concurrent conferences occurring on three separate bridges, with each conference utilizing four ports a piece (such as when four participants are included in each conference). Through the embodiments described below, the telecommunications network may determine that the customer is utilizing 12 ports concurrently across the conferences and bill the customer according to the number of concurrent ports used rather than the number of conferences. This may result in billing for the customer's use of the system based on ports used rather than a per-minute basis. Further, a telecommunications network administrator may provide access to the collaboration conferencing system based on a total number of concurrently utilized ports rather than on a per conference or per minute basis. With the information of the number of purchased ports by the customer, the administrator may more accurately predict an available capacity for the collaboration conferencing system needed to support all of the users of the system and the potential collaboration conferences. This more accurate prediction of the potential network usage may allow the network to devote the proper resources to support the collaboration conferencing system of the network. As such, through the system, the customer to the network may receive an alternate billing of the use of the collaboration conferencing system while improving the predicted port availability of the system for future use by the network administrator.

In addition, the collaboration conferencing system may monitor and/or limit the total number of concurrent ports utilized by a particular customer or group of customers. For example, the collaboration conferencing system may track the number of concurrent collaboration conferencing ports utilized by a client over one or more conferencing bridges. If the number of concurrently used ports exceeds or equals a threshold number of ports, the system may take one or more remedial actions. In one example, the system may block the client from establishing a new collaboration conference until the number of concurrently utilized ports by the client drops below the threshold value. In another example, the collaboration conference may increase the billing rate for any collaboration conferencing systems that are established by the client above the threshold number of concurrently used ports. This increased billing rate may occur for the number of conferences, the number of ports used, or the duration of the collaboration conference. In still another example, the collaboration conferencing system may provide the client with a notification of an action taken by the system in response to the number of concurrently utilized ports. In this manner, management of the utilized ports of the collaboration conferencing system across multiple conferencing bridges may be conducted to aid the user and/or the telecommunications network in providing the collaboration feature.

FIG. 1 illustrates an exemplary operating environment 100 for hosting conference collaboration communications between multiple participants. The environment 100 provides for establishing communication sessions between network users. With specific reference to FIG. 1, the environment 100 includes a VoIP network 102, which may be provided by a wholesale network service provider. However, while the environment 100 of FIG. 1 shows a configuration using the VoIP network 102, it should be appreciated that portions of the network 102 may include non IP-based routing. For example, network 102 may include devices utilizing time division multiplexing (TDM) or plain old telephone service (POTS) switching. In general, the network 102 of FIG. 1 may include any communication network devices known or hereafter developed.

The VoIP network 102 includes numerous components such as, but not limited to gateways, routers, and registrars, which enable communication across the VoIP network 102, but are not shown or described in detail here because those skilled in the art will readily understand these components. More relevant to this description is the interaction and communication between the VoIP network 102 and other entities, such as the one or more customer home or business local area networks (LANs) 106, where a participant in a conference will connect with the system for the conference.

Customer network 106 can include communication devices such as, but not limited to, a personal computer or a telephone 110 connected to a router/firewall 114. Although shown in FIG. 1 as computer 110, the communication devices may include any type of communication device that receives a multimedia signal, such as an audio, video or web-based signal, and presents that signal for use by a user of the communication device. The communication and networking components of the customer network 106 enable a user at the customer network 106 to communicate via the VoIP network 102 to other communication devices, such as another customer network and/or an analog telephone 115, 120. Components of the customer network 106 are typically home- or business-based, but they can be relocated and may be designed for easy portability. For example, the communication device 110 may be wireless (e.g., cellular) telephone, smart phone, tablet or portable laptop computer.

The customer network 106 typically connects to the VoIP network 102 via a border network 122, such as one provided by an Internet Service Provider (ISP). The border network 122 is typically provided and maintained by a business or organization such as a local telephone company or cable company. The border network 122 may provide network/communication-related services to their customers. In contrast, the communication device 120 accesses, and is accessed by, the VoIP network 102 via a public switched telephone network (PSTN) 126 operated by a local exchange carrier (LEC). Communication via any of the networks can be wired, wireless, or any combination thereof. Additionally, the border network 122 and PSTN 126 may communicate, in some embodiments, with the VoIP Network 102 through a media gateway device (130, 132). For ease of instruction, only three communication devices 110, 115, 120 are shown communicating with the VoIP network 102; however, numerous such devices, and other devices, may be connected with the network, which is equipped to handle enormous numbers of simultaneous calls and other communications.

In general, a request for a collaboration conference over the VoIP network 102 is initiated by a requester through one of the communication devices 110, 115, 120 associated with the network. As used herein, the term "collaboration conference" includes any type of collaboration between three or more users of a communication network. For example, the collaboration conference may include audio collaboration, video collaboration, web collaboration, a combination of any of the above, and the like. For ease of instruction, the collaboration conferences discussed herein are generally made in reference to an audio conference, although any type of collaboration conference over a telecommunications network is envisioned with respect to the present disclosure. Similarly, although FIG. 1 illustrates some of the communication devices 115, 120 as telephonic devices, the communication devices may be any type of communication device, including personal computers, cellular phones and the like.

Upon receipt of the request for a collaboration conference, the network 102 routes the request to a routing device 140 or routing devices integrated within the network 102. However, it should be appreciated that the routing device 140 may be a part of the network 102, may be separate from the network, or may have portions deployed in the network and out of the network. In addition, the routing device 140 may be resident on one or more components of the VoIP network 140, including several instances of the routing device 140 integrated throughout the network 140. Further, although only a single instance of a routing device 140 is illustrated in FIG. 1, any number of routing devices may be present in the network 102. In one particular embodiment, the routing device 140 is referred to as a Collaboration Conferencing Routing Server (CCRS).

To transmit the request to the network, the requester uses the communication device 110, 115, 120 to enter a conference specific telephone number or access port. The routing device 140 receives the request to begin a collaboration conference or join an existing conference. In response, and described in more detail below, the routing device 140 may route the one or more requests to one of several conference bridges 142, 144 associated with the VoIP network 102 for hosting of the collaboration conference. Although only two conference bridges 142, 144 are shown in FIG. 1, it should be appreciated that any number of conference bridges may be associated with the network 102 for hosting collaboration conferences.

In general, the conference bridges 142, 144 provide a hosting site for a collaboration conference between a plurality of users of the network 102. Thus, conference bridge A 142 may host a collaboration conference while conference bridge B 144 may host an additional collaboration conference. In particular, conference bridge A 142 is connected to the communications network 102 through a media gateway 133 similar to the media gateway disclosed above. This configuration may be utilized when the conference bridge 142 is a time division multiplex (TDM) bridge. Conference bridge B 144 is internal to the VoIP network 102 through which the communications of the conference are transmitted. This configuration is utilized for Internet Protocol (IP) based bridges and is generally described in more detail below.

One particular network and/or conference bridge platform supported by the network configuration 102 of FIG. 1 is a Session Initiation Protocol (SIP) based network. For example, conference bridge B 144 may be a SIP-based conference bridge. Such IP-based components may provide additional conferencing features to the network by providing information concerning the collaboration conference in a header of a message transmitted through the network such as an identification of the collaboration conference, video integration, Uniform Resource Identifier (URI) based routing and conference integration, conference access credentials for authentication and permission to enter the requested conference. SIP-based conference bridges may also provide high definition audio, additional security features and transitions between collaboration conferences without having to redial into the system. In general, because components operating utilizing SIP can exchange information within a header, many additional features for a collaboration conference can be offered to participants on a SIP-based conference bridge. In addition, SIP-based CCRS devices may utilize many of the advantages of information exchange within the header when communicating with TDM-based network devices.

To connect to a collaboration conference, each participant to the conference may be routed to the same conference bridge 144 for the duration of the conference. The conference bridge 144, in turn, provides communication ports for each participant such that each participant can hear or otherwise participate in the collaboration conference. Any conference bridge known in the art or hereafter developed may be integrated into the system 100 of FIG. 1 for hosting a collaboration conference, including IP-based conference bridges. In addition, the term "conference bridge" or "bridge" includes any component of a communication network that provides an access point to one or more users of the network for a collaboration conference. For example, "conference bridge" may also include such devices as a media server device, a gateway server device or the like as configured within the network 102.

In some instances, the conference bridge 144 or routing device 140, upon receipt of the request to initiate or join a collaboration conference, executes an application that queries the requester to enter an access code number that the requester enters into the communication device 110, 115, 120. With this information, the network 102 determines that the requester intends to initiate or join a collaboration conference and routes the request to a conference bridge, as explained in greater detail below. Thus, each participant to the collaboration conference may provide the same access code to the routing device 140 to be routed to the same bridge to attend the collaboration conference. Further, in some networks, the conferencing bridge 142, 144 may request additional information from a chairperson of the collaboration conference to identify the participant as the chairperson. In a similar manner as described above, the chairperson may provide the information to the bridge 142, 144 through the communication device 110, 115, 120 to identify the participant as the chairperson. The chairperson of the collaboration conference is generally given access to additional features of the collaboration conference.

As mentioned above, users to the collaboration conferencing system are provided an access code that is used to access or initiate a conferencing session on the system. Further, some clients to the telecommunications network may be provided multiple access codes to the conferencing system. For example, a client to the network may be a corporation with several employees. The network may assign a unique access code to each employee of the corporation for access to the collaboration conferencing system, with each access code being associated with the corporation client. For billing purposes to the client corporation, the network may aggregate the use of the collaboration system by all of the employees. However, as mentioned above, this often occurs on a conferencing session or per minute basis. Further, because the employees may use different access codes for a collaboration conference, the conferences may be hosted on separate conferencing bridges of the network.

Figure 2:
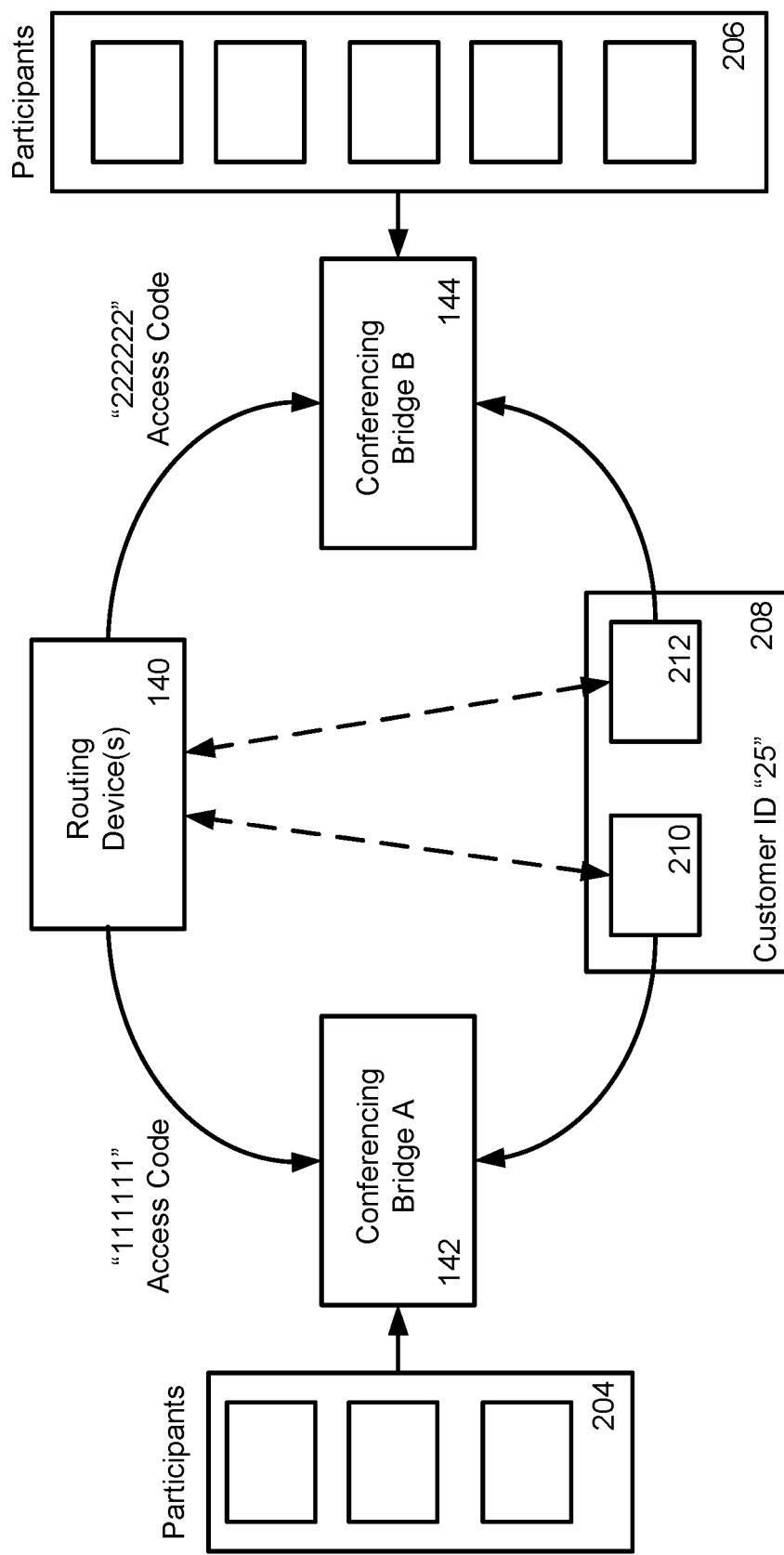
FIG. 2 is a diagram illustrating an example of concurrent port usage by a customer to a network of a collaboration conferencing system.

FIG. 2 is a diagram illustrating an example of concurrent port usage by a customer to a network of a collaboration conferencing system. Several of the components of the system 200 are similar to those components described above, such as the routing device 140, conferencing bridge A 142 and conferencing bridge B 144. Utilizing the example system 200 shown, an example is now provided to illustrate the use of multiple access codes for the collaboration conference for a single client 208 to the network. In particular, a client 208 with a network-assigned customer ID of 25 may contact an administrator of the VoIP network for collaboration conference access for employees or other parties associated with the client. The administrator, in response, provides the customer 208 with access numbers and access codes to utilize the collaboration conferencing feature. In one particular embodiment, the access number is a telephone number assigned to the customer 208 (with customer ID "25") for accessing the collaboration conferencing system. Other customers to the network may receive different access numbers to utilize the conferencing system. Further, access codes may be the same or different between customers. In one instance, the access code may be used to identify a particular user as the chairperson or subscriber of the conference. In another instance, the access code is utilized to identify a particular conference to which a participant intends to join and the chairperson provides an additional personal identification number (PIN) to identify themselves as the chairperson. Thus, participants to a collaboration conference may use an access number and access code to join a conference that is initiated or started by a chairperson using the user's PIN. In general and depending on the type of collaboration conferencing system, the combination of the access number, access code, and/or a PIN allow a user to initiate or join a collaboration session on the collaboration conferencing system.

In one example, a first employee or user 210 associated with the client 208 utilizes the access number and a first access code (such as "111111") to initiate a collaboration conference. In particular, the user utilizes a communication device 110 to contact the routing device 140 and provide the access number and the first access code. The routing device 140 verifies the access code as valid and directs the user's communication to a first conferencing bridge 142 to host the collaboration conference. Other participants 204 to the conference on the first conferencing bridge 142 utilize their own communication device to dial the same access number and access code to access the initiated collaboration conference. For each participant 204 to the collaboration conference on the first conferencing bridge 142, a communication port is opened by the bridge to provide a connection between the participant's communication device and the bridge. In this manner, the number of ports of the bridge 142 utilized for the collaboration conference indicates the number of participants to the conference.

In addition, a second employee 212 also associated with the customer 208 (and customer ID "25") contacts the routing device 140 from another communication device 120 and provides an access number and a second access code (such as "222222") to initiate a collaboration conference. In return, the routing device 140 verifies the second access code as valid and directs the user's communication to a second conferencing bridge 144 to host the collaboration conference. It should be appreciated that the second collaboration conference may also be hosted on the first conferencing bridge or any other conferencing bridge of the network 102. Other participants 206 to the conference on the second conferencing bridge 144 also provide the same access number and second access code to access the initiated collaboration conference. Similar to above, each participant 206 to the collaboration on the second conferencing bridge 144 utilizes a communication port of the bridge. Also, although the first employee 210 and the second employee 212 provide different access codes and have collaborations hosted on separate conferencing bridges 142, 144, each employee user and collaboration may be considered by the network 102 as belonging to a single client 208 of the network for billing and routing purposes.

In one embodiment of the network 102, the routing device 140 maintains a table of concurrent conferencing sessions of the network. For the example mentioned above, assume that the collaboration hosted on conferencing bridge A 142 includes four total ports (three participants 204 and the chairperson 210) and the collaboration hosted on conferencing bridge B 144 includes six total ports (five participants 206 and the chairperson 212). The routing device 140 may maintain a table of information about the conferences, such as:

TABLE 1

| Customer ID | Access Code | Start Time | Status | Ports |
|---|---|---|---|---|
| 25 | 111111 | 09:31 | Active | 4 |
| 25 | 222222 | 09:34 | Active | 6 |
| 111 | 345543 | 09:36 | Active | 48 |
| 222 | 543345 | 09:36 | Active | 172 |

As shown in Table 1, the routing device 140 maintains a listing of each initiated conferencing session by customer ID and access code used to establish the collaboration conference. For customer ID 25, the table includes the conferences for access code "111111" and "222222". In addition, the routing device 140 maintains a start time for each conference, a status for each conference, and the number of ports utilized for each conference. More or less information may be maintained by the routing device 140 in other embodiments. In one particular embodiment, the information included in the table may be received from the one or more conferencing bridges 142, 144 in communication with the routing device 140. In this embodiment, the routing device 140 may query each conferencing bridge 142, 144 for such collaboration conferencing information and store the received information into the table. In general, the table maintained by the routing device 140 may include all of the conferences hosted by all of the conferencing bridges of the network. For example, Table 1 includes an entry for a collaboration conference for customer ID 111 and access code "345543" and customer ID 222 and access code "543345". In general, the table may include information for any number of collaboration conferences initiated and managed by the collaboration conferencing system of the network. The table illustrated above is but a simple example of the information maintained by the routing device 140.

In some instances, the client 208 to the network 102 is billed for the collaboration conferences indicated in the table. For example, an administrator of the network 102 may determine that access code 111111 was used to establish a first collaboration conference and access code 222222 was used to establish a second collaboration conference. Further, the administrator may determine that each access code is associated with a single client 208 to the network based on the customer ID such that the client is billed for both collaboration conferences. However, in many cases the number of ports utilized by each collaboration conference is not considered as the billing occurs based on the initiation of the collaboration conference or the length of the conferences. Further, each conference may host up to some threshold number of participants (such as 300 participants on one conference) without any prior indication to the network 102. Thus, port access to a particular conferencing bridge 142, 144 may become scarce based on the size of a particular conference session.

Figure 3:
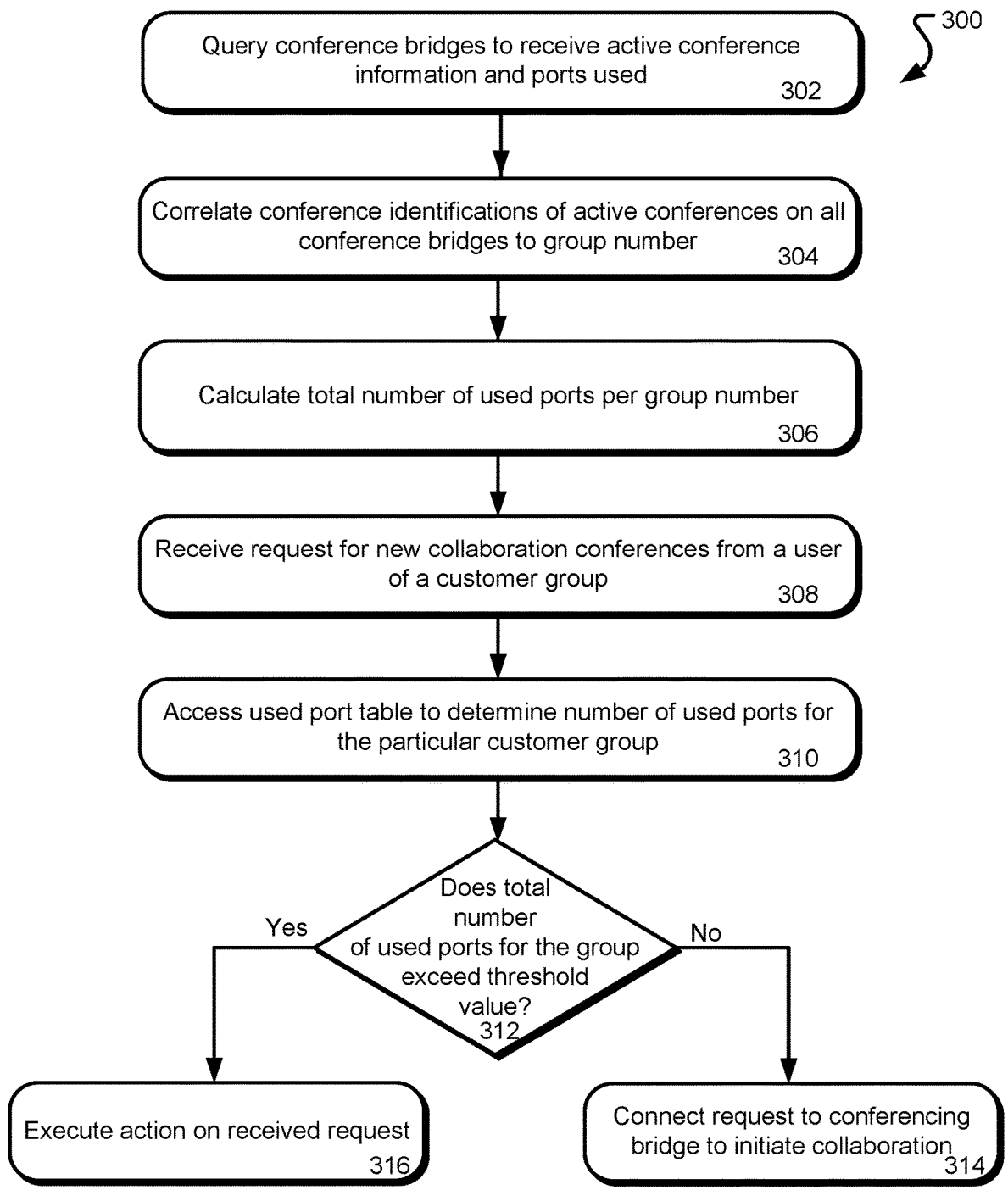
FIG. 3 is a flowchart of a method for managing concurrent collaboration conferencing port usage in a collaboration conferencing system.

To address these issues, FIG. 3 illustrates a flowchart of a method 300 for managing concurrent collaboration conferencing port usage in a collaboration conferencing system. In general, the operations of the method 300 of FIG. 3 are performed by the routing device 140 of the network 102. However, it should be appreciated that any number and types of networking devices may perform one or more of the operations described. Further, the operations may be performed through one or more executed software instructions, one or more hardware components or circuits, or a combination of both software and hardware components.

Beginning in operation 302, the routing device 140 queries one or more conferencing bridges 142, 144 in communication with the routing device for information concerning collaboration conferences hosted by the conferencing bridges. The information may include access codes utilized to initiate the collaboration conference, a start time of the collaboration conference, a status of the collaboration conference (such as "active", "inactive", "temporary", etc.), and/or the number of communication ports opened for each collaboration conference.

In operation 304, the routing device 140 correlates the access numbers/codes of the initiated collaboration conferences to one or more client or group identifiers. In one embodiment, one or more access numbers/codes to the collaboration conference system may be associated with a group identification or group number, such as employees of a corporation client to the network 102. In this operation, the routing device 140 accesses the table of concurrent conferencing sessions and combines those sessions associated with access codes for a particular client together. For example, assume that access code 111111 and 222222 in Table 1 above are a part of the same group client to the network 102. The group may be identified by any identifying value, such as group value 25. Through an analysis of the stored information, such as summing the active ports in Table 1 for active conferences by customer ID, the routing device 140 determines the number of active ports utilized by a particular customer of the collaboration conferencing system.

The routing device 140 may determine the number of active ports utilized during operation 306 of the method 300 of FIG. 3. In particular, the routing device 140 calculates the total number of active conferences and total number of active ports for one or more group clients to the network 102. Thus, because access code 111111 and 222222 both belong to group 25, the routing device 140 utilizes the information stored in Table 1 to determine that two conferences for group 25 are concurrently active. Further, the routing device 140 totals the number of active ports utilized by the two active conferences. In this particular example, there are ten active ports between the two active conferences for group 25. As should be appreciated, any number of groups and the associated number of active conferences and ports may be determined or calculated by the routing device 140. The information for group 25 is included here to simplify the description of the present disclosure.

The active port information may be utilized by the routing device 140 and/or the network 102 in many ways. For example, the active port information may be updated routinely as more information is received from the conferencing bridges 142, 144 (such as when new conferences are initiated or existing conferences are ended). In addition, the information may be used to provide different types of accounts to users of the collaboration conferencing system. In one example, the routing device 140 may utilize the information to decide when a new collaboration conference may be initiated for a user belonging to a particular group based on the already active ports. In another example, the routing device 140 may utilize the information to determine if more communication ports may be added to an already existing collaboration conference. In this manner, the active port information may be used to determine if access is provided for new conferences or new lines to existing conferences are provided to a particular customer.

More particularly, the routing device 140 may receive a request to initiate a new collaboration conference from an access code in operation 208. In one embodiment, the received access code correlates to a group identified in the table maintained by the routing device 140. For example, a third access code 333333 that is also included or associated with group 25 may be received at the routing device 140 from a user of the collaboration conferencing system. In another example, the routing device 140 receives a request to join an existing collaboration conference by receiving an access code from a requester already assigned to a conferencing bridge. Through accessing the active port information in operation 310, the routing device 140 may determine that the received access code belongs to group 25 and that the group already has at least one active collaboration conference. In addition, the routing device 140 may determine the total number of conference bridge ports utilized by that group (in this case, ten used ports).

In operation 312, the routing device 140 may then compare the total number of used ports for the group associated with the received access code for a new conference or to join an existing conference to a threshold value. In general, the threshold value may be any value that indicates an upper limit on the number of ports that a single customer group may utilize from the collaboration conference system. For example, the customer associated with the customer group number may obtain a usage plan from the network 102 for the collaboration conference system. The plan may allow the customer group to utilize 100 concurrent ports. In one embodiment, the threshold value of operation 312 may be set at 100 concurrent ports for the particular customer group. In other words, if the number of utilized ports for that customer group is equal to or greater than 100, the customer has consumed all of the concurrent active ports available under the customer's usage plan. If the routing device 140 determines that the total number of used ports exceeds (or in some cases, is equal to) the threshold value, the routing device 140 may execute one or more actions on the received request in operation 316. Several examples of the types of actions that the routing device 140 may perform or execute are described in greater detail below. If, on the other hand, the number of used ports does not exceed the threshold value, the routing device 140 may connect the request to a conferencing bridge 142, 144 to initiate or join a collaboration conference in the manner described above in operation 314. Thus, through the total number of ports utilized by a customer group stored in Table 2, the routing device 140 may determine when/if new collaboration conferencing session may be initiated for that particular group.

In the example above, the threshold value is set at the number of active ports purchased by the customer group. However, in such a case, the customer group may exceed the purchased number of ports. For example, assume a customer group usage plan includes 900 concurrent active ports in the system but the customer group is currently utilizing 800 ports on several conferencing bridges 142-144 as indicated in the information table. In this circumstance (and assuming a threshold value of 800), a new collaboration conference for that customer group may be initiated on a conferencing bridge of the network 102. However, a new collaboration conference may configured to include up to 300 additional participants or utilized ports. Thus, the customer group may exceed the upper limit of the usage plan if each of the allowed ports for the new collaboration conference is used. Thus, in some embodiments, the threshold value may be a number less than the upper limit of the group customer's usage plan so that the customer group does not exceed their purchased limit of concurrently used ports. In general, however, the threshold value for a particular customer may be any number. Further, different customer groups of the network 102 may have different threshold values, such that a first customer group may have a first threshold value and a second customer group may have a second threshold value different than the first threshold value.

Regardless of the threshold value used, the routing device 140 may execute one or more actions in response to the group customer exceeding the threshold value number of ports in the collaboration conferencing system. For example, the routing device 140 may execute a hard blocking of any additional requests to initiate a collaboration conference. In the hard blocking action, the collaboration conferencing request to initiate or join a conference on a conferencing bridge 142, 144 is denied by the routing device and the request is not referred to a bridge. In some embodiments, a notification may be provided to the requesting device and/or an administrator of the customer group. In one particular example, a recorded message may be provided to the user's communication device indicating that all conferencing ports of the group are being utilized and to try the conference at a later time. In another example, an electronic message may be created by the routing device 140 and provided to the administrator and/or user's communication device.

Another action that the routing device 140 may take includes altering a billing structure for used ports exceeding the ports in the customer's usage plan. For example, each port utilized in the conferencing system that exceeds the usage plan is billed at a higher rate of usage. Such premium billing may be measured per minute or per collaboration conference, as described above. This information may be gathered and provided to the customer when billing the customer for use of the collaboration conferencing system. In this manner, exceeding the number of concurrently utilized ports for the customer group's usage plan includes a premium billing rate for such usage. In a similar manner, the routing device 140 may alter a billing structure based on the type of request received. For example, a customer may have one or more conferences initiated that consume the number of active ports available for that customer. A request received at the collaboration conferencing system to join an existing conference may be billed to the customer at a first level premium or higher rate as exceeding the usage plan. Further, a request to initiate a new collaboration conference when all or most of the active ports for the customer are being used may cause the customer to be billed at a second level rate that is higher than the first level rate. In other words, it may cost the customer more to initiate a conference that exceeds the usage plan than it does to have a participant join an existing conference that exceeds the usage plan.

In yet another example, the routing device 140 may execute a soft blocking action on new conference requests. In this action, the routing device 140 may allow new collaboration conferences to be initiated when the total number of used ports for the customer group nears the threshold value, but may limit the number of participants to each conference. Further, the allowed number of participants to the conference may be reduced as the total number of used ports gets nearer to the threshold value. In this sense, a throttling to the available collaboration ports for the customer group is applied to newly initiated collaboration conferences for that group.

In still another embodiment, the network administrator may provide usage plans of varying costs and available concurrent active ports based on a timeframe of the conference. For example, a subscription may be provided by the conferencing system or telecommunications network for a number of concurrent active ports in non-peak hours that costs less than concurrent active ports in peak hours. In other words, a subscription for 2000 concurrent active ports between midnight and 6:00 am (or any timeframe noted as "non-peak traffic") may be billed at a lower rate than a subscription for 2000 concurrent active ports between 8:00 am and 5:00 pm (or any timeframe noted as "peak traffic"). In another example, the number of concurrent active ports made available to any one customer may be limited during peak or high traffic hours as demand for available ports may be higher during peak traffic times. Thus, a customer may purchase more concurrent active ports in non-peak times than during high-peak times. The system described herein may provide the mechanism through which such usage plans are implemented and monitored. In general, the timeframe based billing may be based on a time of day, day of the week, month of the year, etc. The potential discounting of concurrent active ports in non-peak hours may aid the operation of the telecommunications network by driving traffic to non-peak hours so that collaboration conferencing ports are being spread across the day or week.

Figure 4:
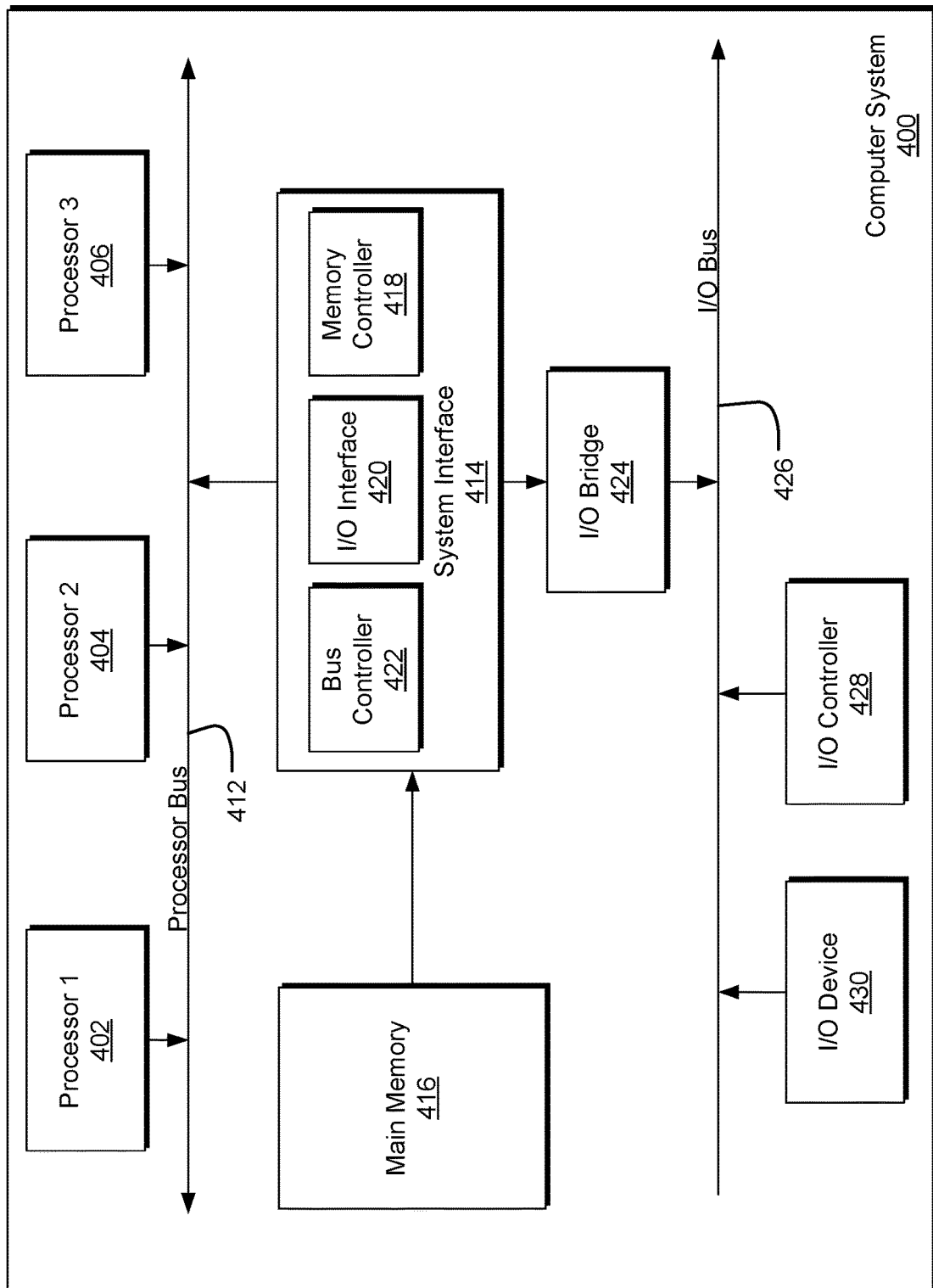
FIG. 4 is a diagram illustrating an example of a computing system which may be used in implementing embodiments of the present disclosure.

FIG. 4 is a block diagram illustrating an example of a computing device or computer system 400 which may be used in implementing embodiments of the present invention. The computer system (system) includes one or more processors 402-406. Processors 402-406 may include one or more internal levels of cache (not shown) and a bus controller or bus interface unit to direct interaction with the processor bus 412. Processor bus 412, also known as the host bus or the front side bus, may be used to couple the processors 402-406 with the system interface 414. Processors 402-406 may also be purpose built for processing/mixing media data, such as audio or video components of a media stream, such as a digital switch processor. System interface 414 may be connected to the processor bus 412 to interface other components of the system 400 with the processor bus 412. For example, system interface 414 may include a memory controller 416 for interfacing a main memory 416 with the processor bus 412. The main memory 416 typically includes one or more memory cards and a control circuit (not shown). System interface 414 may also include an input/output (I/O) interface 420 to interface one or more I/O bridges or I/O devices with the processor bus 412. One or more I/O controllers and/or I/O devices may be connected with the I/O bus 426, such as I/O controller 428 and I/O device 430, as illustrated.

I/O device 430 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device coupled to the processor bus 412 for storing static information and instructions for the processors 402-406. The system set forth in FIG. 4 is but one possible example of a computer system that may employ or be configured in accordance with aspects of the present disclosure.

According to one embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 to perform the process steps described herein. In alternative embodiments, circuitry may be used in place of or in combination with the software instructions. Thus, embodiments of the present disclosure may include both hardware and software components.

A machine readable medium includes any mechanism for storing information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 416. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A telecommunications network comprising:
a plurality of conference bridges; and
at least one routing device configured to:
receive collaboration conferencing information from the plurality of conference bridges, the collaboration conferencing information associated with collaboration conferences hosted by each of the plurality of conference bridges;
correlate the collaboration conferencing information from the plurality of conference bridges with a customer identification of a customer group to the telecommunications network;
calculate a total number of utilized ports of the plurality of conference bridges for the customer group associated with the telecommunications network;

receive a request at the at least one routing device to add more communication ports to a requested collaboration conference hosted by one of the plurality of conference bridges; and process the received request to add at least one communication port to the requested collaboration conference based at least on the calculated total number of utilized ports of the plurality of conference bridges for the customer group.

2. The telecommunications network of claim 1 wherein the at least one routing device is further configured to compare the calculated total number of utilized ports of the plurality of conference bridges for the customer group to a threshold value.

3. The telecommunications network of claim 2 wherein processing the received request to add more communication ports comprises not adding at least one communication port to the requested collaboration conference if the calculated total number of utilized ports of the plurality of conference bridges for the customer group exceeds or equals threshold value.

4. The telecommunications network of claim 3 wherein the at least one routing device is further configured to provide a recorded message to a requester of the more communication ports associated with not adding at least one communication port to the requested collaboration conference.

5. The telecommunications network of claim 2 wherein processing the received request to add more communication ports comprises altering a billing structure for the client for the utilization of the at least one added communication port.

6. The telecommunications network of claim 1 wherein the at least one routing device is further configured to provide the total number of utilized ports of the plurality of conference bridges for the customer group associated with the telecommunications network to a billing system.

7. The telecommunications network of claim 6 wherein the billing system bills the customer group associated with the telecommunications network based on the total number of utilized ports of the plurality of conference bridges.

8. The telecommunications network of claim 1 wherein the telecommunications network is provisioned based at least on the calculated total number of utilized ports of the plurality of conference bridges for the customer group associated with the telecommunications network.

9. A method for operating a collaboration conferencing system, the method comprising:

receiving, at a collaboration conferencing system managing device, collaboration conferencing information from the plurality of conference bridges, the collaboration conferencing information associated with collaboration conferences hosted by each of the plurality of conference bridges;

correlating the collaboration conferencing information from the plurality of conference bridges with a customer identification of a customer group to the telecommunications network;

calculating a total number of utilized ports of the plurality of conference bridges for the customer group associated with the telecommunications network;

receiving a request from a user communication device at the collaboration conferencing system managing device, the request generated to add more communication ports to a requested collaboration conference hosted by one of the plurality of conference bridges; and processing the received request to add at least one communication port to the requested collaboration conference based at least on the calculated total number of utilized ports of the plurality of conference bridges for the customer group.

10. The method of claim 9 further comprising:
comparing the calculated total number of utilized ports of the plurality of conference bridges for the customer group to a threshold value.

11. The method of claim 10 wherein the threshold value is based at least on a time of day the request from the user communication device at the collaboration conferencing system managing device is received.

12. The method of claim 10 wherein processing the received request to add more communication ports comprises not adding at least one communication port to the requested collaboration conference if the calculated total number of utilized ports of the plurality of conference bridges for the customer group exceeds or equals threshold value.

13. The method of claim 12 further comprising:
transmitting a recorded message to the user communication device, the recorded message associated with not adding at least one communication port to the requested collaboration conference.

14. The method of claim 10 wherein processing the received request to initiate the new collaboration conference comprises altering a billing structure for the client for the utilization of the new collaboration conference.

15. The method of claim 9 further comprising:
providing the total number of utilized ports of the plurality of conference bridges for the customer group associated with the telecommunications network to a billing system, and wherein the billing system bills the customer group associated with the telecommunications network based on the total number of utilized ports of the plurality of conference bridges.

16. A collaboration conferencing management device comprising:

at least one communication port for communication with a network;

a processing device; and a computer-readable medium connected to the processing device configured to store information and instructions that, when executed by the processing device, performs the operations of:

receiving, at a collaboration conferencing system managing device, collaboration conferencing information from the plurality of conference bridges, the collaboration conferencing information associated with collaboration conferences hosted by each of the plurality of conference bridges;

correlating the collaboration conferencing information from the plurality of conference bridges with a customer identification of a customer group to the telecommunications network;

calculating a total number of utilized ports of the plurality of conference bridges for the customer group associated with the telecommunications network;

receiving a request from a user communication device at the collaboration conferencing system managing device, the request generated to add more communication ports to a requested collaboration conference hosted by one of the plurality of conference bridges; and processing the received request to add at least one communication port to the requested collaboration conference based at least on the calculated total number of utilized ports of the plurality of conference bridges for the customer group.

17. The collaboration conferencing management device of claim 16 wherein the instructions further cause the processing device to perform the operation of: comparing the calculated total number of utilized ports of the plurality of conference bridges for the customer group to a threshold value.

18. The collaboration conferencing management device of claim 16 wherein processing the received request to initiate the new collaboration conference comprises not adding at least one communication port to the requested collaboration conference if the calculated total number of utilized ports of the plurality of conference bridges for the customer group exceeds or equals threshold value.

* * * * *